United States Patent
Dukert et al.

[15] 3,680,997
[45] Aug. 1, 1972

[54] EXTRUSION STRIP DIE FOR THERMOPLASTIC SHEET

[72] Inventors: Andrew A. Dukert, Ambler; Alkis Christofas, Levittown, both of Pa.

[73] Assignee: Pennwalt Corporation, Philadelphia, Pa.

[22] Filed: June 29, 1970

[21] Appl. No.: 50,514

[52] U.S. Cl. .................................425/381, 425/192
[51] Int. Cl. .................................................B29f 3/06
[58] Field of Search.....................................18/12 DS

[56] References Cited

UNITED STATES PATENTS

| | | |
|---|---|---|
| 3,559,239 | 2/1971 | Work et al. .................18/12 DS |
| 3,003,245 | 10/1961 | Nunez.....................18/12 DS X |
| 3,019,746 | 2/1962 | Cunningham et al....18/12 DS X |
| 3,151,356 | 10/1964 | Senecal.......................18/12 DS |
| 3,145,419 | 8/1964 | Reifenhauser..............18/12 DS |
| 3,360,823 | 1/1968 | Tyrner........................18/12 DS |
| 3,480,998 | 12/1969 | Von Erdberg..............18/12 DS |

OTHER PUBLICATIONS

Schenkel, " International Plastics Engineering," October, 1961, page 453.

*Primary Examiner*—J. Spencer Overholser
*Assistant Examiner*—Michael O. Sutton
*Attorney*—Carl A. Hechmer, Jr. and Stanley Bilker

[57] ABSTRACT

A strip die for extruding high melt viscosity thermoplastic materials into sheet which includes a midstream valving restrictor bar of sectioned configuration. Individually adjustable segments in the valving bar allows the throughput rate, pressure and shear to be varied across the entire die width.

4 Claims, 3 Drawing Figures

INVENTORS
ANDREW A. DUKERT
ALKIS CHRISTOFAS
BY
Stanley Belker
ATTORNEY

INVENTORS
ANDREW A. DUKERT
ALKIS CHRISTOFAS
BY Hanley Bilher
ATTORNEY

EXTRUSION STRIP DIE FOR THERMOPLASTIC SHEET

This invention relates to the extrusion of thermoplastic materials into sheets and/or film. More particularly, this invention relates to a method and apparatus for sheet extruding high melt viscosity resins, such as polyvinylidene fluoride, such that there is continuously adjustable flow control of the polymeric melt at an increased rate of output free from surface flaws and body defects.

Polyvinylidene fluoride is a fluorine-containing thermoplastic resin composed of a high molecular weight polymer of polyvinylidene fluoride. It is crystalline in nature and melts at about 340° F. The melt is thermally stable for periods of about one-half hour at about 500° F., but thereafter degradation occurs slowly unless the melt is allowed to flow freely. Degradation such as significant dehydrofluorination or chain scission becomes particularly rapid at temperatures in excess of 600° F. Although polyvinylidene fluoride resin may be readily expressed into shapes of generally compact cross section, such as rods, tubes, wire coatings and cable jackets, by well known extrusion dies, extruding polyvinylidene, fluoride sheet, film and/or generally thin but wide sections through conventional "flat sheet," "slit" or "coat hanger" design dies presents significant if not insurmountable problems. That is, vinylidene fluoride, like other high melt viscosity polymers characterized by the viscoelastic properties of their melt, requires special treatment and consideration in its passage through the die flow cavity in order to achieve even distribution through the sheet, film or shape forming die lips. Failure to take such conditions into account results in non-uniform sheet caliper, objectionable stresses, undesirable appearance, and generally poor physical, chemical and electrical qualities of the extrudate.

The usual extrusion system for thermoplastic materials consists basically of an extruder, an adaptor, and a die block or body, which includes a forming die, all arranged in tandem. Although relatively little difficulty is encountered in plasticating polyvinylidene fluoride during its exposure to elevated temperature and pressure within the extruder itself, the resin is extremely vulnerable to heat degradation within the adaptor and in the die body. Furthermore, the resin is quite subject to surface, body and dimensional distortions during passage through the shaping dies. Thus, thermal degradation of the resin is apt to occur in the adaptor and die body whenever there are recesses in which bulky and stagnant masses of material can collect and be subjected to high pressures and elevated temperatures for prolonged periods of time, for example, exposure to 500° F. or more in excess of about one-half hour. Accordingly, such recesses sometimes referred to as "hang-up" areas must be avoided in the die body.

In conventional film, sheet or shape extrusion dies, flow equalization along the forming lips is generally controlled by (1) interposing one or more laterally extending cavities in the flow channel of the die body with transversely arranged corresponding land portions defining an arcuate passage-way through which the melt is forced in a divergent path and/or (2) including a transverse flexure bar adjacent the interior of the die lips.

In the first arrangement, there is no means of adjustment, and hence a lack of flexibility in thickness control along the breadth of the sheet being extruded as well as a complete inability to change the stock gauge. In addition, hesitation or hang-up of viscous or slow moving resinous melt in the transverse cavity imposes limitations of processing temperatures within the die body in order to avoid degradation or decomposition. A further problem inherent in the transverse cavity arrangement is the need to open up and disassemble the die completely after each color or resin change in order to insure against contamination. For the most part, empirical remachining or complete rearrangement of the geometry of flow pattern within the die cavity or in die outlet profile was required in order to achieve even distribution of material along the contour of the forming die lips.

Use of the transverse flexure bar only allows limited adjustments in gauge or in thickness control. Since the bar is under constant stress, it is often subject to permanent distortion and frequently presents dormant zones of melted resin which are sensitive to degradation or decomposition. Moreover, since both the extrudate characteristics and the output rate of the shaping dies are dependent upon the viscosity characteristics of the melted resin which varies with temperature, pressure and/or die shearing stress, a super-abundance of skill, technique and ingenuity is required to maintain quality and tolerance at optimum throughput rates. Lastly, neither of the foregoing arrangements is adapted to accommodate for variance in gauge thickness or for differences in grade or molecular weight of the vinylidene fluoride resin itself. It is thus apparent that high costs were involved when one wished to change the form or dimension of the extrudate in hitherto employed extruding devices.

It is therefore an object of this invention to provide a strip die for film and sheet extrusion of polymeric materials at an increased rate of output.

Another object of this invention is to provide an apparatus and method for extruding high melt viscosity thermoplastic materials into uniform sheets which are free from surface and body defects and which are of precision thickness caliper across the entire sheet breadth.

Yet another object of this invention is to provide an improved strip die for viscoelastic resins in which flow control may be precisely and continuously adjusted.

Still another object of this invention is to provide a sheet and film die for polymeric materials that affords internal longitudinal valving and control of melt flow distribution.

Yet still another object of this invention is to provide a method and apparatus for extruding high quality sheet and/or film at increased output rates without any need to remachine or modify the basic geometry of the flow cavity or die lip profile.

A still further object of this invention is to provide a strip die in which there is continuous and precise adjustment in pressure shearing stresses and flow at any desired position along the entire die width under actual operating conditions.

Yet still a further object of this invention is to provide a strip die in which there is a greatly refined degree of control in flow pressure and shearing stresses through the entire die perimeter.

Other objects of this invention are to provide an improved device of the character described which is easily and economically produced, which is sturdy in construction and both highly efficient and effective in operation.

With the above and related objects in view, this invention consists of the details of construction and combination of parts as well be more fully understood from the following detailed description when read in conjunction with the following drawings in which.

Figure 1:
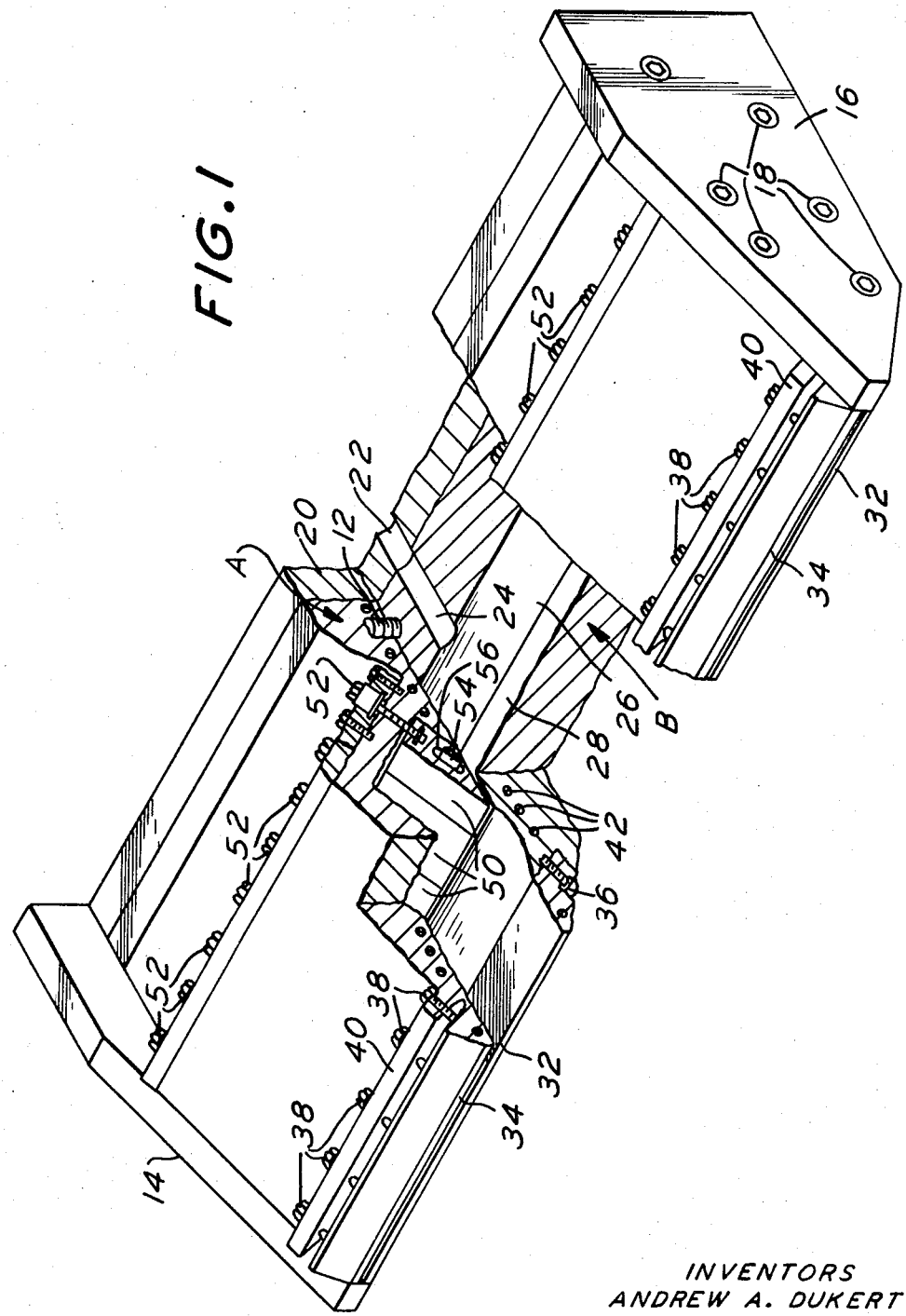
FIG. 1 is a perspective view, and partly broken away, of a sheet extrusion strip die embodying this invention.
Figure 2:
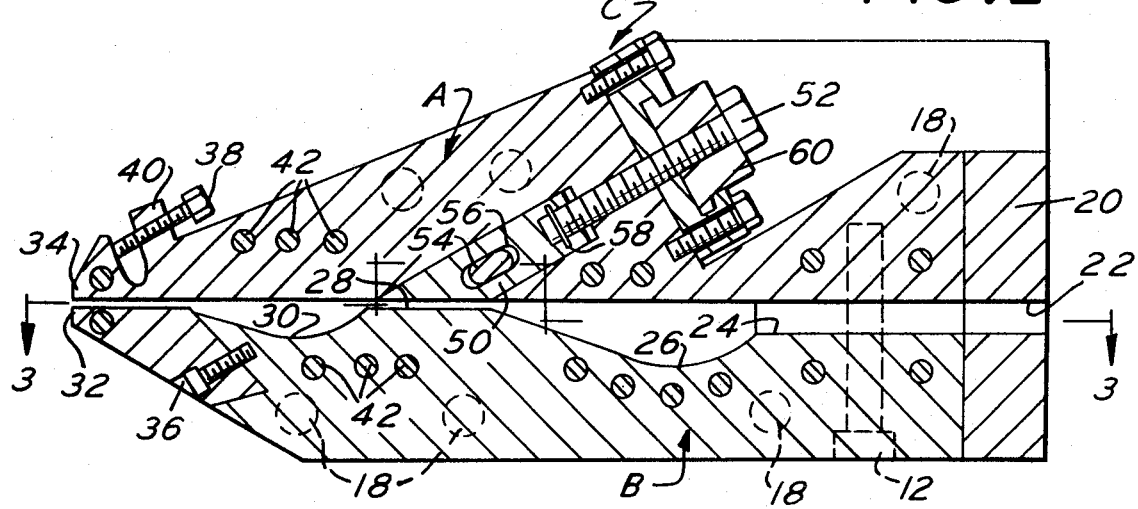
FIG. 2 is a sectional view taken along lines 2—2 of FIG. 1.
Figure 3:
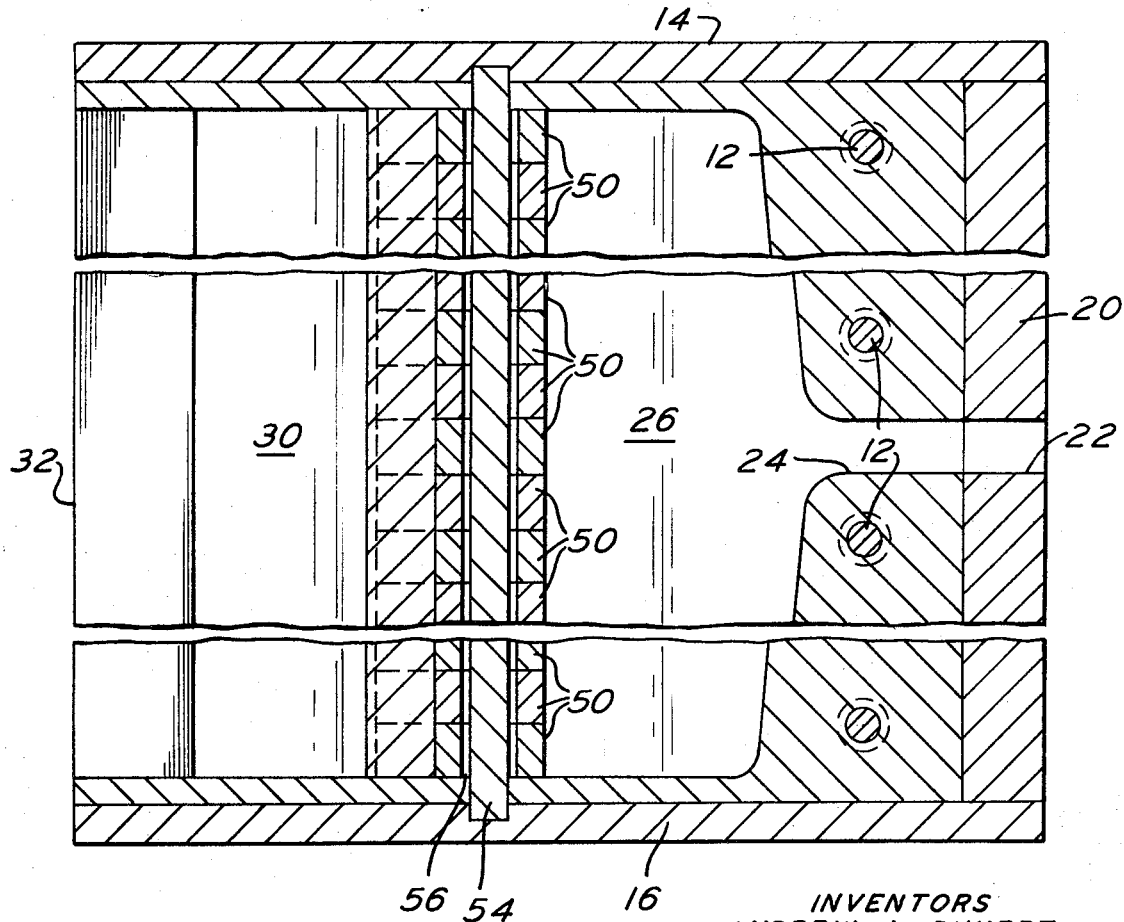
FIG. 3 is a sectional view taken along lines 3—3 of FIG. 2.

Referring now in greater detail to the drawings in which similar reference characters refer to similar parts, there is shown a strip die for extruding high melt viscosity thermoplastic materials comprising a pair of opposed sections A and B which are bolted together in mating disposition. Heavy machine screws 12 pass through counterbored drilled holes in the lower section B into threaded engagement with complementary tapped holes in the upper section A. End or side plates 14 and 16 are secured to the lateral extremities of the mating sections A and B by suitable bolts or heavy machine screws 18.

The die is connected to the discharge end of an extruder barrel (not shown) by an adaptor 20 which includes a resin passageway 22. A longitudinal bore 24 in the lower section B flares outwardly the entire width of the die where it merges with primary high inventory or "coathanger" cavity 26. Immediately downstream of the high inventory cavity 26 is a transverse land portion 28 which acts as a laminar flow area in cooperation with the upper die section A. The land 28 then drops off into a secondary transverse inventory cavity 30 which is situated immediately before die lips 32 and 34. The lower lip 32 in this case is stationary and is affixed to the forward end of the die by a plurality of laterally spaced machine screws 36. The upper die lip 34 is in the form of a resilient member which may be flexed within certain limits by application of point pressure along its width through manipulation of adjusting screws 38. The adjusting screws 38 are threadedly mounted within laterally spaced tapped holes in a cowl 40 arranged just behind the upper lip 34. Varying the degree of pressure of the screws 38 against the back of the lip 36 effects bowing thereof and produces a variation in the spacing between the lips 32 and 34 along their entire breadth. Cartridge heaters 42 are inserted into ports within both die sections wherein die temperatures of up to 1,000° F. may be achieved but preferably in the range of 400° to 800° F.

The basic advancement of the instant invention resides in the use of a sectioned valving member or restrictor bar C which includes a plurality of adjacent segments 50, each individually adjustable by manipulation of a corresponding screw 52. A transverse key 54 extending through elongated slots 56 slidably supports the segments 50 while turning the screws 52 in a predetermined direction allows the segments to be advanced or retracted with respect to the land 28. The segments 50 of the restrictor valve bar C are each approximately 1 to 1½ inches in width and have a configuration which presents a continuous streamlined face to the material emerging from the primary high inventory cavity 26. The end of each screw 52 is rotatably supported within the bore of the corresponding segment 50 and held therein by a lock washer 58, for example. A jam nut 60 threaded upon the upper end of the screw 52 allows the particular segment 50 to be locked in position. Other standard or special locking features can be employed.

The clearance at any desired increment along the laminar flow zone 28 can be adjusted by moving the appropriate segment 50 along its axis. Thus, the melt arrives at the secondary high inventory area 30 with an adjusted volumetric throughput along the entire die width and thereby reaches the forming lips 32 and 34 with adjusted equal velocity and pressure along the entire breadth. If minor adjustments are still necessary, the flexing lip 34 may still be appropriately reoriented by screws 38. It is therefore apparent that the use of a sectioned valve or restrictor bar C with individually adjustable segments 50 permits optimum extrusion conditions to be attained at all times. The film exiting from the die is cooled and sized in accordance with the usual practices for extruded thermoplastic materials.

While the segmented valving bar C has been described in connection with film forming operations, it is to be understood that the invention is equally applicable to the drawing of shapes simply by substituting for the forming lips 32 and 34 the appropriate die orifice configuration. Once the pressure, volume, shear and deformation rates have been set by appropriate adjustment of the valving means C, the characteristics of the extrudate can be easily controlled merely by readjustment of the individual segments thereof.

Although this invention has been described in considerable detail and in particular connection with polyvinylidene fluoride resins, such description is intended as being illustrative rather than limiting since the invention may be variously embodied in application to the extrusion of other thermoplastics, and the scope of the invention is to be determined as claimed.

We claim:

1. A strip die for the extrusion of high melt viscosity thermoplastic materials into sheets comprising
a pair of spaced die sections including a relatively thin broad channel of generally flat configuration therebetween including means for laterally distributing thermoplastic melt therein,
an inlet into which molten thermoplastic resin may be fed for delivery to the channel,
a pair of lips through which the thermoplastic melt can be extruded in generally sheet-like configuration, and
valving means including a plurality of individually adjustable laterally contiguous segments for varying the spacing of the channel in transverse increments,
each of said segments including one flat face oriented substantially parallel to the path of travel of the advancing melt stream and one inclined flat face oriented at an acute angle with respect to said advancing melt stream, said inclined faces lying in substantially a single plane, and
means for adjusting each of said segments along corresponding axes parallel to said plane so that only parallel inclined faces confront the advancing melt stream while said first mentioned flat faces define channel walls to effect streamlined flow of the melt stream with a smooth profile conforming substantially to the channel configuration as the valve segments are interposed therein.

2. The strip die of claim 1 including a primary inventory area comprising a transverse cavity in one of said die sections immediately upstream of said valving means and a secondary inventory area immediately downstream of said valving means.

3. The strip die of claim 2 wherein said valving segments are positioned by adjusting screws.

4. The strip die of claim 3 including means for adjustably flexing the lips with respect to each other.

* * * * *